United States Patent [19]

Przywozny et al.

[11] 4,189,649

[45] Feb. 19, 1980

[54] CONTROL PANEL FOR AUTOMATIC TRANSFER SWITCH

[75] Inventors: Walter C. Przywozny, Whippany; William A. Moakler, Basking Ridge, both of N.J.

[73] Assignee: Automatic Switch Company, Florham Park, N.J.

[21] Appl. No.: 966,187

[22] Filed: Dec. 1, 1978

[51] Int. Cl.² ............................................. H02J 9/08
[52] U.S. Cl. ........................................ 307/64; 307/68
[58] Field of Search ..................... 307/64, 67, 87, 68

[56] References Cited

U.S. PATENT DOCUMENTS

| | | | |
|---|---|---|---|
| 2,785,317 | 3/1957 | Langberg et al. | 307/68 X |
| 3,300,651 | 1/1967 | Larsen | 307/64 X |
| 3,351,770 | 11/1967 | O'Sullivan et al. | 307/64 |

Primary Examiner—L. T. Hix
Assistant Examiner—James L. Dwyer
Attorney, Agent, or Firm—Alan H. Levine

[57] ABSTRACT

A control panel, formed entirely of solid state components, for an automatic transfer switch which alternatively connects a load to a normal source of power or starts up an emergency source of power and connects the load to it. The control panel includes monitors for the normal and emergency sources, the monitors having a pickup voltage and a lower dropout voltage, relays for initiating operation of the emergency or normal sources when the normal source drops below the dropout level or the emergency source rises above the pickup voltage or frequency level, and time delay circuits between the monitors and the relays preventing operation of the relays unless the voltage levels exist beyond the time periods provided.

6 Claims, 5 Drawing Figures

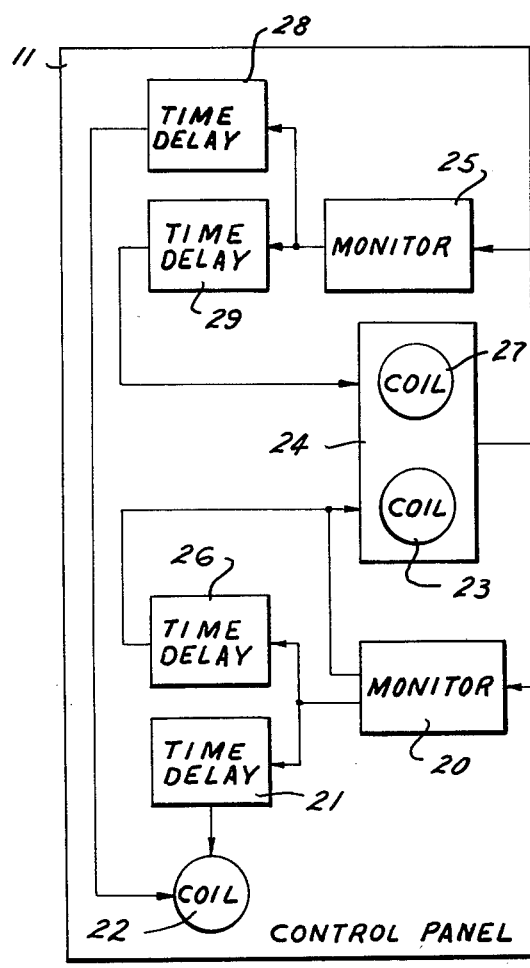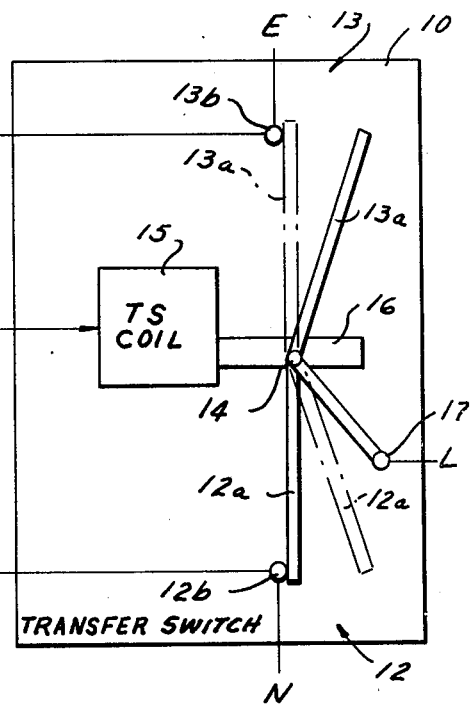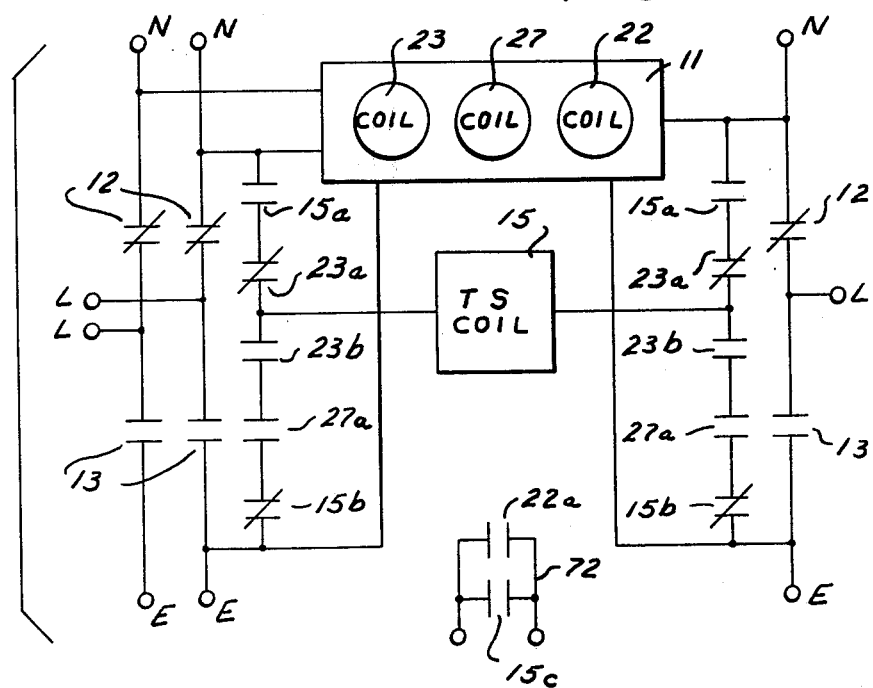
FIG.1
FIG.3

CONTROL PANEL FOR AUTOMATIC TRANSFER SWITCH

This invention relates to automatic transfer switches which are used to transfer a load from a normal source of power, such as an electric utility, to an emergency source of power, such as a local engine/generator set, in the event that the normal source fails, and then retransfer the load when the normal source returns. More particularly, the invention relates to a control panel for controlling operation of the transfer switch and for starting and stopping the engine/generator set.

Such a control panel normally has a monitor for sensing the voltage of the normal source, the monitor having a pickup voltage level and a lower dropout voltage level. When the normal source voltage drops below the dropout level, the monitor indicates that the source has failed. The normal source voltage must then return to the higher pickup level before the monitor indicates that the source has returned. A time delay is provided to prevent the emergency power source from being started should the normal source voltage only momentarily drop below the dropout level. However, conventionally, the normal source voltage would have to rise above the pickup level during the time delay period for the monitor not to react. As a result, an acceptable power source is sometimes made to appear unacceptable.

It is an object of the present invention to overcome this problem by providing feedback means to the monitor for causing it, during the period of the time delay, to accept the normal source as long as it returns above the dropout level.

It is another object of the invention to provide a control panel having a monitor which continuously monitors the voltage of all three phases of a three phase normal source.

Both the voltage and frequency of the emergency source are monitored, and the transfer switch is operated, to transfer the load from the normal source to the emergency source, only after the voltage and frequency are acceptable. Conventionally, an interactive type voltage and frequency sensor is used which indicates acceptability of the emergency source if the product of the voltage and frequency are above a predetermined value. The problem with this approach is that if the voltage is very high and frequency very low, or vice versa, the sensor will find an unacceptable source to be acceptable. Also, where both voltage and frequency are low but acceptable, their product may be below the acceptable level of the sensor.

It is an object of the present invention to overcome this problem by providing individual voltage and frequency sensors the outputs of which are used independently to control the means for operating the transfer switch.

The emergency source voltage sensor is provided with the same type of pickup/dropout differential mentioned above with respect to the normal source monitor. In addition, a time delay is provided to prevent operation of the transfer switch, to connect the load to the emergency source, to insure that the emergency source has not just momentarily risen above the pickup value. However, conventionally, the emergency source would be accepted, even though unstable, as long as its voltage remains above the dropout level.

It is an object of the present invention to insure stability of the emergency source before the transfer switch is operated by restarting the time delay each time the emergency source voltage falls below the pickup level.

The emergency source is started and maintained running by closing of a pair of relay contacts, the relay being responsive to the output of the normal source voltage monitor. Should the normal source return while the load is connected to the emergency source, the normal source monitor will signal for the transfer switch to connect the load to the normal source, and will open the relay contacts to shut down the emergency source. However, should the transfer switch malfunction and not disconnect the load from the emergency source and connect it to the normal source, the load will be without power when the emergency source shuts down.

It is an object of the present invention to overcome this problem by providing in parallel with the relay contacts an auxiliary pair of contacts controlled by the condition of the transfer switch, i.e., the auxiliary contacts are closed when the transfer switch connects the load to the emergency source and open when the load is connected to the normal source. Consequently, the emergency source is kept operating through the auxiliary contacts, should the transfer switch fail to return to the normal source, even though the relay contacts open.

The normal source voltage monitor controls a relay having four pairs of contacts, two pairs being open and two pairs closed at any one time. Two pairs of contacts condition the transfer switch to operate in one direction when the normal source fails, and the other two pairs cause the transfer switch to operate in the other direction when the normal source returns. The transfer switch also includes four pairs of auxiliary contacts in series with the four pairs of relay contacts, respectively. In the past, each pair of relay contacts has been arranged between a pair of auxiliary contacts and one of the power sources. As a result, the relay contacts must continuously support the full source voltage. In addition, a four pole relay must be used since there are no common points between the pairs of relay contacts.

It is an object of this invention to change the arrangement of the relay contacts and auxiliary contacts to permit use of a smaller two pole relay. Specifically, the positions of the relay contact and auxiliary contacts are reversed so that each pair of auxiliary contacts is between each pair of relay contacts and a power source.

Additional objects and features of the invention will be apparent from the following description in which reference is made to the accompanying drawings.

In the drawings:

FIG. 1 is a diagram showing the relationship between an automatic transfer switch and a control panel according to this invention;

FIG. 3 is a schematic diagram showing the control panel, power sources, relay contacts, and transfer switch coil and auxiliary contacts;

Figure 2:
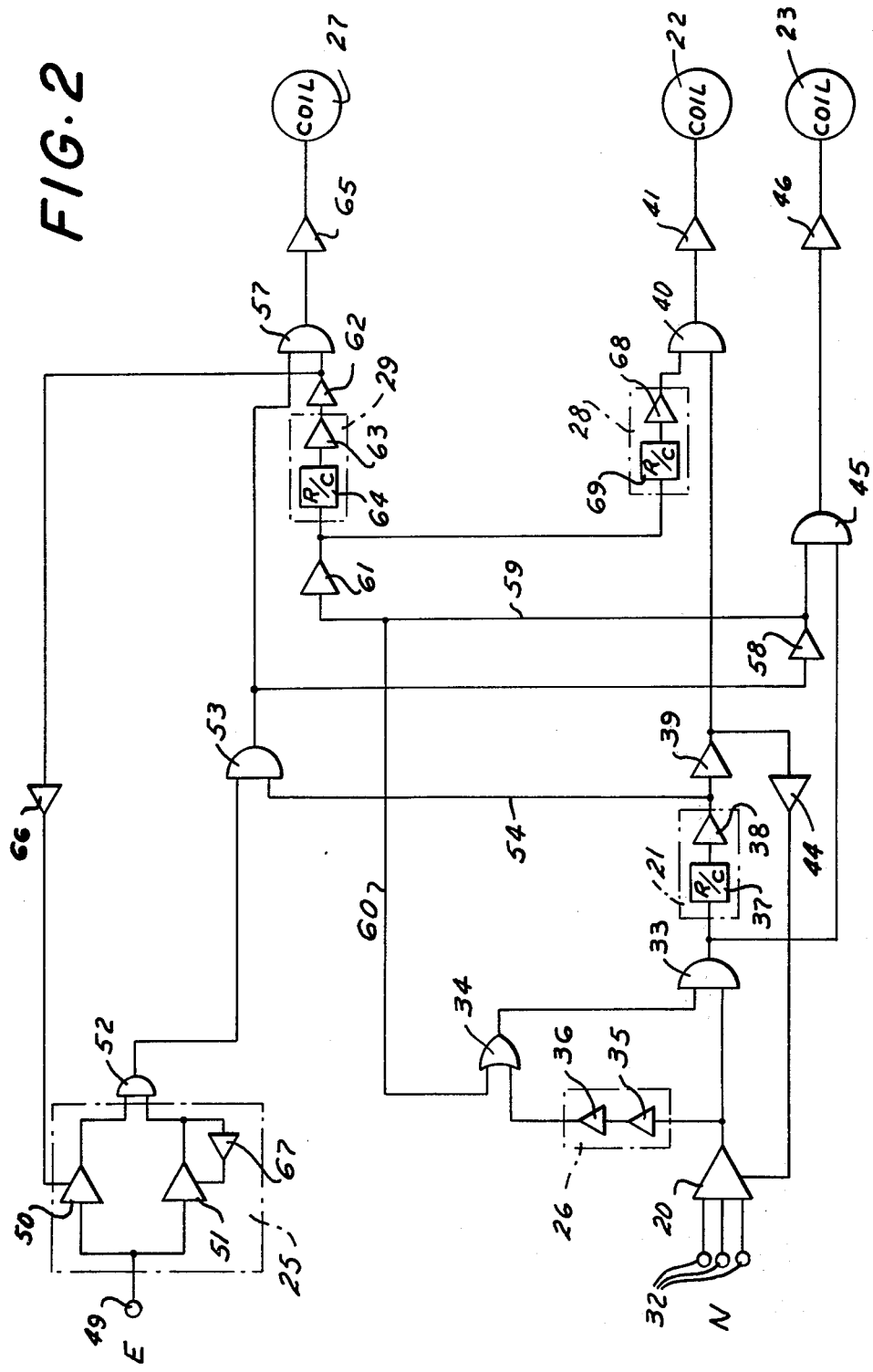
FIG. 2 is a logic diagram of the control panel.

FIG. 1 shows, in diagrammatic form, an automatic transfer switch 10 and a control panel 11. The automatic transfer switch includes switches 12 and 13, the former comprising a movable contact 12a and a stationary contact 12b, and the latter comprising a movable contact 13a and a stationary contact 13b. Stationary contacts 12b and 13b are permanently connected to a normal source of power and an emergency source of power, respectively. Movable contacts 12a and 13a are mounted for movement together about an axis 14. In the diagram of FIG. 1, only a single pole, double through transfer switch is shown. However, since such transfer switches are usually used with three phase power, there are usually three switches 12 and three switches 13 (see FIG. 3), all the movable contacts of the switches being movable together, i.e., the transfer switch is a triple pole, double through switch. Automatic transfer switch 10 also includes an electromagnetic coil 15, having an armature 16, for operating the movable switch contacts 12a and 13a. Each pair of movable contacts 12a and 13a are permanently connected to a terminal 17 which is in turn connected to a load.

Control panel 11 shown in FIG. 1 includes a device 20 for monitoring the voltage level of each phase of the normal source. The output of monitor 20 controls, through a time delay circuit 21, a relay coil 22 and another relay coil 23 forming part of the transfer switch control circuitry 24. Monitor 20 also controls coil 23 through another time delay circuit 26. A device 25 monitors the voltage and frequency of the emergency source, and controls, through a time delay circuit 29 a relay coil 27 also forming part of the transfer switch control circuitry 24. Monitor 25 also controls relay coil 22 through a time delay circuit 28.

In FIG. 1, transfer switch 10 is shown in solid lines closed on the normal source, i.e., switches 12 closed and switches 13 open, so that the load is connected to the normal source, e.g., an electric utility. Monitor 20 produces a signal which maintains both relay coils 22 and 23 energized. Should one or more phases of the normal source fail, monitor 20 produces a signal which immediately deenergizes relay coil 23. The signal produced by monitor 20 also, after a brief time delay caused by circuit 21, usually one or a few seconds, deenergizes relay coil 22. Deenergized relay 22 causes an auxiliary engine, such as a local gasoline or diesel engine, to start, the engine driving an emergency generator. Deenergization of relay 23 conditions control circuitry 24 to operate the transfer switch 10. The reason for the brief time delay is to prevent unnecessary operation of transfer switch 10 and starting of the auxiliary engine in response to momentary interruptions and reductions of the normal source.

When monitor 25 senses that the voltage and frequency now being produced by the emergency generator have reached acceptable levels, it produces a signal, after a time delay caused by circuitry 29, resulting in energization of relay coil 27. The time delay produced by time delay circuit 29, which may be up to five minutes, insures that monitor 25 has not sensed just a momentary high voltage produced by the emergency generator. As a result, transfer switch coil 15 is energized momentarily to shift movable contacts 12a and 13a to the broken line position shown in FIG. 1, i.e., switches 12 open and switches 13 closed. Hence, the load is now connected to the emergency source.

Time delay circuitry 26 prevents transfer switch 10 from switching the load from the emergency source to the normal source for at least a predetermined period, often 25 or 30 minutes, regardless of whether or not the normal source returns before that time. The reason is that good performance of the engine-generator set is insured if allowed to run under load for the predetermined time period, and the normal source has an opportunity to stabilize before the load is retransferred to it.

When the normal source voltage returns to an acceptable level, monitor 20 produces a signal causing relay coil 23 to be energized and coil 27 to be deenergized. As a result, transfer switch coil 15 is again energized momentarily to shift movable contacts 12a and 13a back to their solid line position, so that the load is once again connected to the normal source. Relay coil 22 is not immediately energized, due to a signal received from monitor 25 through time delay circuit 28. The latter maintains relay coil 22 deenergized for a short period, say about five minutes, to allow the engine-generator an unloaded "cool-down" run.

The control panel, illustrated in more detail in FIG. 2, consists entirely of solid state components, except for relay coils 22, 23, and 27. Monitor 20, which may be an operational amplifier arrangement, has three connections 32 for continuously sensing the voltages of all three phases of a normal source. Only the voltage of the normal source need be sensed because the frequency of electric utility power is, as a practical matter, constant. In past control panels, the voltage of only two normal source phases was continuously monitored, the voltage of the third phase being monitored only after a 25 minute or so delay, such as is imposed by time delay circuit 26.

The output of monitor 20 is applied to one of the inputs of an AND gate 33; the output is also applied, through timing circuit 26, to an input of an OR gate 34. Timing circuit 26 includes an inverter 35 and an integrated circuit 36, such as sold by Motorola under Catalog No. MC 14541CP. Circuit 36 is such that when the input to it is high, its output is low. When the input changes to low, the output switches to high only after a delay, for example 25 minutes.

The output of OR gate 34 is applied to the other input of AND gate 33. The output of AND gate 33 is applied through time delay circuit 21, which may include a resistor/capacitor circuit 37 and a Schmitt Trigger 38, to the input of an inverter 39. The output of inverter 39 is applied to one of the inputs of an AND gate 40, the output of which is applied to a transistor 41. When transistor 41 turns on, it causes relay coil 22 to be energized, and when transistor 41 turns off, relay coil 22 is deenergized. As described above, relay 22 controls the starting of the emergency engine-generator set.

A feedback loop including a transistor 44 extends from the output of inverter 39 to monitor 20.

The output of AND gate 33 is also applied to one of the inputs of an AND gate 45, the output of which is applied to a transistor 46. When transistor 46 turns on, it causes relay coil 23 to be energized, and when transistor 46 turns off, relay coil 23 is deenergized. As described above, relay 23 controls transfer switch coil 15 (FIG. 1) to shift transfer switch 10 so that it closes on the normal source.

Monitor 25 has a connection 49 to the emergency source of power. The signal received at connection 49 is applied to the input of a voltage sensor 50 and the input of a frequency sensor 51. The outputs of these sensors are applied to the two inputs of an AND gate 52, the output of which is applied to one of the inputs of an AND gate 53. The other input of AND gate 53 is connected, by line 54, to the output of time delay circuit 21.

The output of AND gate 53 is applied to one of the inputs of an AND gate 57; the output of AND gate 53 is also applied, through inverter 58, to one of the inputs of AND gate 45. The output of inverter 58, in addition to being connected to one of the inputs of AND gate 45, is connected by lines 59 and 60 to one of the inputs of OR gate 34. The output of inverter 58 is also connected by line 59, inverter 61, time delay circuit 29, and inverter 62, to one of the inputs of AND gate 57. Time delay circuit 29 includes a Schmitt Trigger 63 and a resistor/capacitor circuit 64. The output of AND gate 57 is applied to a transistor 65, and when the latter turns on, relay coil 27 is energized. As described above, relay 27 controls transfer switch coil 15 (FIG. 1) to shift transfer switch 10 so that it closes on the emergency source. The output of inverter 61 is also applied to time delay circuit 28, comprising a Schmitt Trigger 68 and a resistor/capacitor circuit 69, the output of which is applied to one of the inputs of AND gate 40.

A feedback loop including a transistor 66 connects the output of inverter 62 to voltage monitor 50. Frequency sensor 51 is provided with a feedback loop including an inverter 67, the inverter determining the "drop-out" frequency of sensor 51, i.e., the frequency of the emergency source below which the output of sensor 51 changes from high to low.

To explain the operation of the control panel as illustrated in FIG. 2, assume that the normal source is operating satisfactorily and the emergency source is not in operation. The voltage signals on all three inputs 32 to sensor 20 are high and therefore the output of sensor 20 is high. This high output is applied to one of the inputs of AND gate 33, and also to time delay circuit 26, causing the circuit 26 output to be high. The high output of delay circuit 26 is applied to OR gate 34, causing it to have a high output which is applied to the other input of AND gate 33. As a result, the output of gate 33 is high, and this output is applied to one of the inputs of AND gate 45. The signal applied to the other input of AND gate 45 is also high, as will be explained below, and hence the output of AND gate 45 is high. This high output turns on transistor 46 which results in energization of relay coil 23, the latter remaining energized as long as the normal source continues to function satisfactorily.

Since the emergency source is not operating, there are no signals applied to sensors 50 and 51 of monitor 25. Hence, the outputs of both sensors are low and therefore the output of AND gate 52 is low. This low output is applied to one of the inputs of AND gate 53 and therefore its output is low. The low output of gate 53 is inverted by inverter 58 so that the output of this inverter, which is applied to AND gate 45, is high. The low output of gate 53 is also applied to an input of AND gate 57 resulting in a low output from gate 57 which turns transistor 65 off and deenergizes relay coil 27. Thus, relay coil 27 remains deenergized as long as the emergency source is not functioning.

The high output of inverter 58 is inverted by inverter 61, and hence a low input is applied to time delay circuit 28. Due to the presence of Schmitt Trigger 68, the low input is inverted and a high input applied to AND gate 40. The high output of AND gate 33 is inverted by Schmitt Trigger 38 of time delay circuit 21, and the low output of circuit 21 is inverted by inverter 39, so that a high input is applied to AND gate 40. Since gate 40 receives two high inputs, its output is high, thereby turning on transistor 41 and energizing relay coil 22.

FIG. 3 shows control panel 11 connected to all three phase conductors N of the normal source and to two of the three phase conductors E of the emergency source. It is sufficient to monitor only one phase of the emergency source since this source is usually on the site of the load and hence line runs are short. Consequently, it is highly unlikely that one phase will fail unless all the phases fail. Switches 12 of the automatic transfer switch are closed connecting the phase conductors N to the three phase conductors L of the load. Switches 13 are open, disconnecting the phase conductors E and L.

Transfer switch coil 15 can be energized by either of two alternative circuits. One circuit extends from a normal phase conductor N, through a switch 15a, a switch 23a, coil 15, another switch 23a, and another switch 15a to another normal phase conductor N. The other circuit extends from an emergency phase conductor E, through switches 15b, 27a, and 23b, coil 15, and switches 23b, 27a, and 15b to another emergency phase conductor D. Switches 15a and 15b are controlled by the position of the movable contacts 12a and 13a (FIG. 1) of the automatic transfer switch, i.e., when the transfer switch is closed on the normal source, switches 15a are open and switches 15b are closed; when the transfer switch is closed on the emergency source, switches 15a are closed and switches 15b are open. Switches 23a and 23b form part of a double pole, double throw switch controlled by relay coil 23. Switches 27a and 22a are controlled by relay coils 27 and 22, respectively.

Switch 22a is in a circuit 72 for controlling the start of the emergency engine/generator set. A switch 15c is in parallel with switch 22a and is controlled by the position of the movable contacts of the transfer switch, switch 15a being open when the transfer switch is closed on the normal source, and closed when the transfer switch is closed on the emergency source. In FIG. 3, the switches are shown with the transfer switch closed on the normal source, which is operating, relay coils 22 and 23 energized, and relay coil 27 deenergized, i.e., the condition described above with reference to FIG. 2.

Referring again to FIG. 2, it should be pointed out that conventionally, sensor 20 has a "pickup" voltage level and a "dropout" voltage level which are different, the pickup level being higher than the dropout level, e.g., the pickup level being 95% of nominal voltage and the dropout level being 85% nominal voltage. The reason for this differential is to prevent sensor 20 from indicating loss of the normal source should the voltage fluctuate when load is applied, i.e., the sensor continues to have a high output even though the normal source voltage drops to just above the dropout level but below the pickup level. On the other hand, should the normal source fail, resulting in switching the load to the emergency source, sensor 20 will not produce a high output to cause return of the load to the normal source unless the normal source returns to the pickup voltage level. This insures that the load is not switched back to the normal source until that source has returned to a satisfactory condition.

When sensor 20 senses reduction of voltage below the dropout level in one or more of the normal phases at 32, its output changes from high to low. Hence the output of AND gate 33 changes from high to low. However, the output of time delay circuit 21 remains low for one or a few seconds, whereby the output of inverter 39 remains high, so that AND gate 40 keeps transistor 41 on and relay coil 22 energized. As a result, for that brief time delay, the auxiliary engine does not start. Should the normal source voltage return, the output of sensor 20 becomes high again and the load continues to be connected to the normal source. In the past, under these conditions, if the normal source voltage dropped even momentarily below the dropout level, the voltage would then have to rise in the brief time delay period above the pickup level to avoid starting the auxiliary engine. However, according to the present invention, the feedback loop including transistor 44 overcomes this problem. The output of inverter 39 is fed back to sensor 20, throughout the time delay period provided by circuit 21, to cause sensor 20 to accept voltage from the normal source above the dropout level as sufficient to produce a high output from sensor 20. Thus, should normal source voltage momentarily drop below the dropout level, the voltage need only return above the dropout level to produce a high output from sensor 20, provided the voltage returns above the dropout level before the end of the time delay provided by circuit 21.

Figure 4:
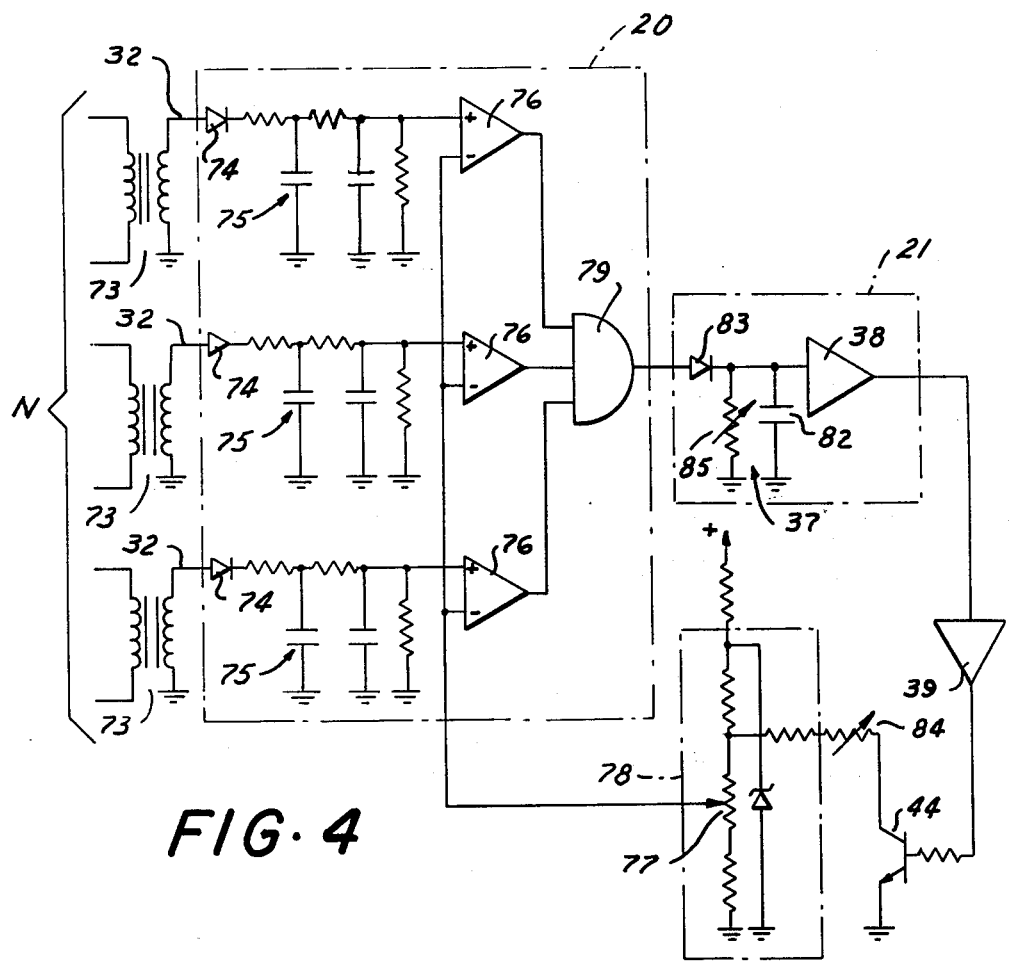
FIG. 4 is a schematic diagram showing the feedback loop to the normal source monitor.

The manner in which the feedback loop including transistor 44 accomplishes the result described immediately above is illustrated in more detail in FIG. 4. Voltage from each normal source phase is applied to a transformer 73, the output of each transformer being applied to one of the phase connections 32 of monitor 20. Within the monitor, for each phase, are a rectifier 74 and a resistor/capacitor network 75 which together provide a DC voltage directly proportional to the AC voltage at each connection 32. Each DC phase voltage is fed to the noninverting input (+) of an operational amplifier 76. The inverting input (−) of each operational amplifier is connected to a pickup potentiometer 77 in a reference voltage circuit 78. The DC voltages derived from the input connections 32 are compared to the voltage established on pickup potentiometer 77. If the DC voltage from each phase exceeds the reference value on potentiometer 77, the output of all the operational amplifiers 76 will be high. If all the operational amplifiers have high outputs, the output of AND gate 79 will also be high.

When the output of AND gate 79 is high, it charges capacitor 82 through diode 83 to a value of voltage above the threshold of Schmitt Trigger 38 in time delay circuit 21, which causes the output of Schmitt Trigger 38 to be low. The output of Schmitt Trigger 38 is fed to inverter 39 causing its output to be high, which in turn causes transistor 44 to turn on. When transistor 44 turns on, it shunts a dropout potentiometer 84 across pickup potentiometer 77, thereby causing the voltage on the arm of pickup potentiometer 77 to drop lowering the reference voltage. Since the voltage on the inverting side of each operational amplifier 76 is now lower, the phase voltages can drop to a lower value before the amplifiers 76 turn off. This in effect has lowered the initial pickup setting of amplifiers 76 which can now be redefined as the dropout value.

If one of the normal source phases dips below the newly established dropout value, the associated amplifier 76 will have a low output causing the output of AND gate 79 to be low. Capacitor 82, which is now fully charged, will slowly decay through potentiometer 85. As long as the voltage on capacitor 82 remains above the threshold point established by Schmitt Trigger 38, transistor 44 will remain on maintaining the lower pickup setting of amplifiers 76 (now defined as the dropout value). If the normal source phase voltage should restore before capacitor 82 discharges, amplifiers 76 will cause AND gate 79 to have a high output, recharging capacitor 82 and maintaining the dropout voltage setting. However, if the phase voltage does not return above the dropout setting before capacitor 82 discharges, then Schmitt Trigger 38 will turn off causing transistor 44 to turn off, thereby removing the shunt across pickup potentiometer 77 and restoring the initial pickup value.

Should the normal source voltage in any phase fail or remain below the dropout level beyond the time delay period of circuit 21, the output of circuit 21 becomes high whereupon the output of inverter 39 becomes low. As a result, the output of AND gate 40 goes from high to low, turning transistor 41 off and deenergizing relay coil 22. Relay contacts 22a (FIG. 3) then close, completing circuit 72, and the auxiliary engine starts driving the emergency generator. At the same time, the input from AND gate 33 to AND gate 45 becomes low, so that the output of gate 45 becomes low, turning off transistor 46 and deenergizing relay coil 23. Relay contacts 23a (FIG. 3) open and relay contacts 23b close. However, transfer switch coil 15 is not yet energized, because relay contacts 27a are still open.

Voltage sensor 50 and frequency sensor 51 continuously monitor the voltage and frequency being produced by the emergency generator, and when the voltage and frequency each rise above a predetermined value, each sensor produces a high output which is applied to an input of AND gate 52. As a result, a high input is applied to AND gate 53. AND gate 53 also receives a high input from the output of time delay circuit 21; therefore the output of gate 53 is high, and this output is applied to AND gate 57. The high output of AND gate 53 is inverted by inverter 58, and inverted again by inverter 61. The high output of inverter 61 is applied to time delay circuit 29, which after a delay of up to a few minutes produces a low output. This output is inverted by inverter 62, and therefore another high input is applied to AND gate 57. The output of gate 57 becomes high, turning on transistor 65 and energizing coil 27.

Energization of coil 27 causes relay contacts 27a (FIG. 3) to close. As a result, a circuit is completed from an emergency phase conductor E, through closed contacts 15b, closed contacts 27a, closed contacts 23b, transfer switch coil 15, and closed contacts 23b, 27a, and 15b to another emergency phase conductor E. Coil 15 is thereby energized and causes the movable contacts 12a and 13a to swing so as to close switches 13 and open switches 12. The load is now connected to the emergency source and disconnected from the normal source. At the same time, contacts 15b open, to deenergize coil 15, and contacts 15a close.

Like voltage sensor 20, voltage sensor 50 has a pickup voltage level at which it produces a high output, and a lower dropout level at which it shifts to a low output. A feedback loop including transistor 66 is provided to override the pickup/dropout differential during the time the emergency generator is first starting. Specifically, when the emergency source first rises to the pickup voltage level, timer 29 begins running, and during that time the low output of inverter 62 is fed back to sensor 50 through transistor 66. Should the emergency voltage level fall even momentarily below the pickup level, timer 29 is automatically reset to its initial setting and starts the time delay period over. Consequently, the emergency source must produce voltage above the pickup level of sensor 50 for the full duration of time delay circuit 29 before relay coil 27 is energized to transfer the load. This insures stability of the emergency source before the load is transferred to it.

Figure 5:
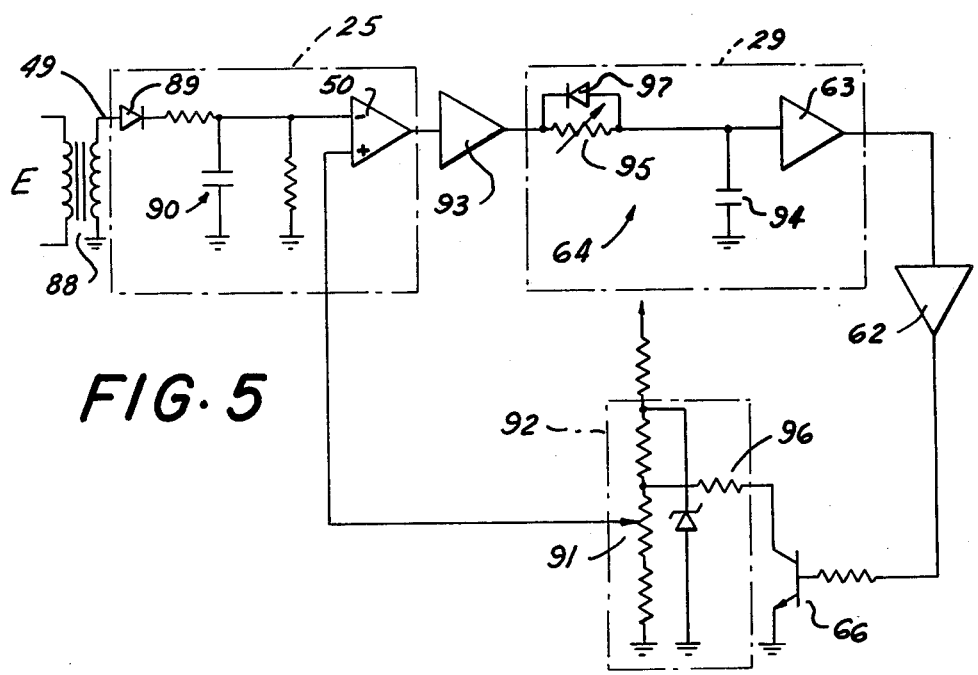
FIG. 5 is a schematic diagram showing the feedback loop to the emergency source voltage monitor.

The manner in which the feedback loop including transistor 66 accomplishes the result described immediately above is illustrated in more detail in FIG. 5. Voltage from the emergency source is applied to a transformer 88, the output of the transformer being applied to connection 49 of monitor 25. Within the monitor is a rectifier 89 and a resistor/capacitor network 90 which together provide a DC voltage directly proportional to the AC voltage at connection 49. The DC voltage is fed to the inverting input (−) of operational amplifier 50. The noninverting input of amplifier 50 is connected to a pickup potentiometer 91 in a reference voltage circuit 92. The DC voltage derived from the connection 49 is compared to the voltage established on pickup potentiometer 91. If the DC voltage representative of the emergency source voltage exceeds the reference value on potentiometer 91, the output of amplifier 50 will be low. This output is applied to an inverter 93, the high output of which charges a capacitor 94 through a variable resistor 95. After a predetermined time delay, say five minutes, established by resistor 95 and capacitor 94, capacitor 94 is charged to a value above the threshold of Schmitt Trigger 63, causing the output Schmitt Trigger 63 to be low. This output is inverted by inverter 62, and the high output of the inverter turns on transistor 66. When transistor 66 turns on, it shunts a dropout resistor 96 across pickup potentiometer 91 thereby causing the voltage on the arm of potentiometer 91 to drop lowering the reference voltage.

Suppose the DC voltage applied to amplifier 50 drops below the reference voltage established by potentiometer 91 before expiration of the time delay established by capacitor 94 and resistor 95. The output from amplifier 50 becomes high, and hence the output of inverter 93 becomes low. Charging of capacitor 94 is discontinued, and in fact capacitor 94 discharges through a diode 97. As a result, Schmitt Trigger does not turn on and its output remains high. The output of inverter 62 is therefore low and transistor 66 remains turned off. The DC voltage applied to amplifier 50 must now rise above the pickup level established by potentiometer 91 before capacitor 94 begins charging again, and the DC voltage must remain at that level for the full duration of the time delay period before the charge on capacitor 94 reaches the threshold value of Schmitt Trigger 63.

While the emergency source is operating, the output of AND gate 53 is high and hence the output of inverter 58 is low. This low output is applied to OR gate 34 via lines 59 and 60. In addition, the output of time delay circuit 26 does not change from low to high until 25 minutes after sensor 20 produces a high output. During this 25 minutes, the input to OR gate 34 from circuit 26 is low.

After the delay produced by circuit 26, the output of the circuit becomes high, whereupon the output of OR gate 34 becomes high. As a result, coil 23 becomes energized, and relay contacts 23a (FIG. 3) close and contacts 23b open. Therefore, a circuit is completed from a normal phase conductor N, through closed contacts 15a and 23a, coil 15, and closed contacts 23a and 15a to another normal phase conductor N. Consequently, coil 15 is energized causing another operation of the transfer switch resulting in closing of switches 12 and opening of switches 13. The load is now reconnected to the normal source.

Relay coil 22 is not immediately energized upon retransfer of the load to the normal source. When the output of AND gate 33 becomes high, the output of circuit 21 becomes low. This low output is applied to AND gate 53, causing its output to become low. The low output of gate 53 causes a low output of AND gate 57 which turns off transistor 65 and deenergizes relay coil 27. In addition, the low output of gate 53 is inverted by inverter 58 and inverted again by inverter 61, so that a low input is applied to time delay circuit 28. Only after a time delay up to five minutes, the output of circuit 28 becomes high to produce a high output from AND gate 40. This turns on transistor 41 and energizes coil 22, causing relay contacts 22a (FIG. 3) to open and shut down the auxiliary engine.

In the event that the normal source returns while the load is connected to the emergency source, whereupon relay coil 23 and shortly thereafter relay coil 22 are energized, but the transfer switch malfunctions and fails to open switches 13 and close switches 12, switch 15c will remain closed even though switch 22a has opened. The emergency source is thereby kept running and the load is maintained energized until the transfer switch is repaired.

It should also be pointed out that according to the present invention contacts 15a are arranged between the normal source and relay contacts 23a, and similarly contacts 15b are arranged between the emergency source and relay contacts 23b. As a result, line voltage is not continuously applied to the relay contacts 23a and 23b, but only for the moment coil 15 is being energized. If the positions of contacts 15a and 23a, and of 15b and 23b, were reversed, as is conventional, full line voltage is applied to the contacts 23a and 23b whenever the contacts are closed. Consequently, instead of using a four pole relatively heavy duty relay 23, as is conventional, the present invention permits use of a smaller two pole relay. A four pole relay was needed in the past because there were no common points between the relay 23 contacts.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A control panel for an automatic transfer switch which alternatively connects a load to a normal source of power or starts up an emergency source of power and connects the load to it, the control panel comprising:
   (a) means for monitoring the normal source voltage, said monitoring means producing a high output when the normal source voltage is above a pickup level and producing a low output when the normal source voltage is below a dropout level, the pickup level being higher than the dropout level,
   (b) means responsive to only the low output from said monitoring means for initiating operation of the emergency source of power,
   (c) time delay means between said monitoring means and said responsive means for preventing said responsive means from responding to a low output from said monitoring means for the duration of the time delay imposed by said time delay means, and
   (d) feedback means connected between said time delay means and said monitoring means for causing said monitoring means to produce a high output as long as the normal source voltage is above the dropout level for the duration of the time delay produced by said time delay means.

2. A control panel as defined in claim 1 for use with a three phase normal source, and wherein said monitoring means continuously monitors the voltage of all three phases of the normal source.

3. A control panel as defined in claim 1 including means for monitoring the emergency power source, said means including individual voltage and frequency sensors, each of said sensors producing a particular output signal when the voltage and frequency, respectively, are above a predetermined level, and means responsive to the particular output signal received independently from each of said voltage and frequency sensors for operating the transfer switch to connect the load to the emergency source.

4. A control panel as defined in claim 1 including
(e) means for sensing the emergency source voltage, said sensing means producing a high output when the emergency source voltage is above a pickup level and producing a low output when the emergency source voltage is below a dropout level, the pickup level being higher than the dropout level,
(f) means responsive to the high output, but not the low output, from said sensing means for operating the transfer switch to connect the load to the emergency source,
(g) time delay means between said sensing means and said responsive means (f) for preventing said responsive means from responding to a high output from said sensing means for the duration of the time delay imposed by said time delay means (g), and
(h) feedback means connected between said time delay means (g) and said sensing means for causing said time delay means (g) to be reset to reinitiate the time delay each time the emergency source voltage drops below the pickup voltage.

5. A control panel as defined in claim 1 wherein said responsive means (b) includes an electromechanical relay comprising a pair of relay contacts in a circuit for initiating operation of the emergency source of power, said contacts being open when the output of said monitor (a) is high and closed to complete said circuit when the output of said monitor (a) is low, and a pair of auxiliary transfer switch contacts in parallel with said relay contacts, said auxiliary contacts being closed when the transfer switch is closed on the emergency source and open when the transfer switch is closed on the normal source.

6. A control panel as defined in claim 1 including a relay having two pairs of contacts, one pair closing in response to a low output from said monitor for conditioning the transfer switch to operate to transfer the load from the normal source to the emergency source, and the other pair closing in response to a high output from said monitor for operating the transfer switch to transfer the load from the emergency source to the normal source, and two pairs of auxiliary transfer switch contacts, one pair of auxiliary contacts being between said one pair of relay contacts and the normal source, and the other pair of auxiliary contacts being between said other pair of relay contacts and the emergency source, said one pair of auxiliary contacts being open when the load is connected to the normal source, and said other pair of auxiliary contacts being open when the load is connected to the emergency source, whereby said relay contacts are separated from line voltage except during the periods that the transfer switch is operated.

* * * * *